(12) United States Patent
Luukkonen (10) Patent No.: US 9,649,665 B2
(45) Date of Patent: May 16, 2017

(54) VIBRATING EQUIPMENT AND METHOD OF PROCESSING MATERIAL

(71) Applicant: SANDVIK MINING AND CONSTRUCTION OY, Tampere (FI)

(72) Inventor: Kimmo Luukkonen, Tampere (FI)

(73) Assignee: SANDVIK MINING AND CONSTRUCTION OY, Tampere (FI)

( * ) Notice: Subject to any disclaimer, the term of this patent is extended or adjusted under 35 U.S.C. 154(b) by 0 days.

(21) Appl. No.: 14/653,968

(22) PCT Filed: Nov. 26, 2013

(86) PCT No.: PCT/EP2013/074702
§ 371 (c)(1),
(2) Date: Jun. 19, 2015

(87) PCT Pub. No.: WO2014/095259
PCT Pub. Date: Jun. 26, 2014

(65) Prior Publication Data
US 2015/0353290 A1  Dec. 10, 2015

(30) Foreign Application Priority Data

Dec. 20, 2012  (EP) ..................................... 12198793

(51) Int. Cl.
*B07B 1/36* (2006.01)
*B07B 1/40* (2006.01)
*B65G 27/32* (2006.01)

(52) U.S. Cl.
CPC .................. *B07B 1/40* (2013.01); *B07B 1/36* (2013.01); *B65G 27/32* (2013.01)

(58) Field of Classification Search
CPC .............. B07B 1/36; B07B 1/40; B65G 27/16
See application file for complete search history.

(56) References Cited

U.S. PATENT DOCUMENTS

| 2,236,341 | A | * | 3/1941 | Markley | ................. B07B 1/282 |
| | | | | | 209/326 |
| 2,874,841 | A | | 2/1959 | Peterson | |
| 3,796,299 | A | * | 3/1974 | Musschoot | ............... B06B 1/16 |
| | | | | | 198/753 |
| 4,482,455 | A | * | 11/1984 | Humphrey | ................ B07B 1/28 |
| | | | | | 209/319 |
| 5,265,730 | A | | 11/1993 | Norris | |
| 7,905,358 | B2 | * | 3/2011 | Backes | ................. B07B 1/4654 |
| | | | | | 209/274 |

(Continued)

FOREIGN PATENT DOCUMENTS

| EP | 0028792 A2 | * | 5/1981 | ............... B07B 1/34 |
| FR | 2570300 A1 | * | 3/1986 | ............... B07B 1/36 |

(Continued)

*Primary Examiner* — Thomas Randazzo
(74) *Attorney, Agent, or Firm* — Corrine R. Gorski (57) ABSTRACT

Vibrating equipment is provided with a vibrating body supported on a frame. The vibrating body is vibrated by at least one first vibrating device, wherein a vibrating deck of the vibrating body moves in a vertical direction and in a machine direction. The vibrating equipment additionally includes at least one second vibrating device arranged to vibrate the vibrating deck in a lateral direction. Further, a method of processing a material is disclosed.

15 Claims, 5 Drawing Sheets

(56) References Cited

U.S. PATENT DOCUMENTS 8,550,233 B2 * 10/2013 Perroud ................ B65G 27/34
                                                    198/502.2
2011/0284344 A1    11/2011 Perroud et al.
2011/0284455 A1 *  11/2011 Robertson ............ B07B 1/4663
                                                    210/499

FOREIGN PATENT DOCUMENTS

FR           2604376 A1 *  4/1988  ............... B06B 1/16
GB            944950 A  * 12/1963  ............. B07B 1/286
WO     WO 0023202 A1 *  4/2000  ............... B07B 1/42

* cited by examiner

VIBRATING EQUIPMENT AND METHOD OF PROCESSING MATERIAL

RELATED APPLICATION DATA

This application is a §371 National Stage Application of PCT International Application No. PCT/EP2013/074702 filed Nov. 26, 2013, claiming priority of EP Application No. 12198793.7, filed Dec. 20, 2012.

BACKGROUND OF THE INVENTION

The disclosed solution relates to vibrating equipment, and particularly to vibrating equipment designed for processing a material.

Further, the solution relates to a method of processing a material by means of vibrating equipment.

The field of the invention is defined more specifically in the preambles of the independent claims.

In mining and construction industry, a need exists for transporting and screening a soil material. In order to facilitate processing of the soil material different vibrating equipment is used. The vibrating equipment comprises a vibrating deck on which the soil material is processed. The vibrating deck is vibrated during the processing in an xy-plane defined by a vertical y-direction and a machine x-direction of the vibrating equipment. However, processing efficiency is not proved to be satisfactory.

BRIEF DESCRIPTION OF THE INVENTION

An object of the invention is to provide novel and improved vibrating equipment and a method of processing a material.

The vibrating equipment according to the invention is characterized in that the vibrating equipment further comprises at least one independent second vibrating device causing the vibrating body to vibrate laterally relative to an xy-plane.

The method according to the invention is characterized by vibrating the vibrating body laterally relative to an xy-plane; and generating the lateral movement independently of the vertical movement and the machine direction movement.

An idea of the disclosed solution is that the vibrating equipment is provided with vibrating means for generating a lateral vibrating movement in the vibrating body. The lateral movement is generated by means of one or more second vibrating devices that are independent of one or more first vibrating devices causing basic movements in a vertical direction and in a machine direction. The lateral movement or vibration is transverse to the machine direction of the vibrating equipment. In other words, the lateral movement or vibration is transverse to a vertical xy-plane, where the vertical y-movement and machine direction x-movement of the vibrating body occur.

An advantage of the disclosed solution is that the lateral movement of the vibrating deck increases processing capacity. Further, clogging and accumulation of the processed material on the vibrating deck may be avoided. The lateral vibration movement also makes it possible to process problematic materials and mixtures. When utilizing the additional lateral movement, a sticky and flake-like material may be processed without problems. Thanks to the lateral movement, it is also possible to decrease vibrating movements in the vertical direction and in the machine direction, whereby one or more basic vibrating devices having reduced output capacity, size and cost may be utilized. Further, it has surprisingly been noted that the lateral movement decreases wearing of the vibrating deck, thus increasing the service life.

According to an embodiment, the one or more additional second vibrating devices for producing lateral vibration are physically and functionally independent of a basic vibrating means comprising one or more first vibrating devices. The independent second vibrating device is provided with fastening means of its own, allowing it to be located separately from the basic vibrating means. Further, the independent second vibrating device is provided with power supply means of its own and control means of its own, whereby the second vibrating device may be controlled independently and separately.

According to an embodiment, the vibrating body comprises side plates, which are in the machine direction and delimit the vibrating body in the lateral direction. One or more second vibrating devices are mounted to the side plate of the vibrating body. Thus, the second vibrating device vibrates the vibrating body and the vibrating deck in the lateral direction. The second vibrating device may be mounted against an outer surface of the side plate, whereby the second vibrating device may be protected against impurities and blows. The outer surface of the side plate serves as a rigid and wide mounting surface against which it is relatively easy to fasten as many second vibrating devices as required.

According to an embodiment, the second vibrating device is arranged at a center of gravity of the vibrating equipment.

According to an embodiment, at least two second vibrating devices are arranged at a center of gravity of the vibrating equipment. One second vibrating device may be arranged on both sides of the vibrating body.

According to an embodiment, the vibrating equipment comprises at least two second vibrating devices arranged at a distance from each other and at an equal distance from a center of gravity of the vibrating equipment. When the two second vibrating devices are located at the equal distance from the center of gravity, they generate forces that eliminate or at least reduce forces other than desired forces causing lateral movement.

According to an embodiment, the vibrating equipment comprises two second vibrating devices. The second vibrating device comprises a rotating device and at least one unbalance weight which is rotated by the rotating device around a rotational axis. Rotation directions of the two second vibrating devices are transverse to each other in order to eliminate forces in the machine direction x, or in the vertical direction y, depending on the direction of the rotational axis. Thanks to the opposing rotation directions, mainly or purely lateral z-direction forces are generated.

According to an embodiment, a pair of second vibrating devices is arranged at least on one side of the vibrating body. The pair of second vibrating devices is arranged at a center of gravity and rotation directions of the second vibration devices are transverse to each other in the pair. Thanks to the opposing rotation directions, mainly or purely lateral z-direction forces are generated in the pair.

According to an embodiment, at least two second vibrating devices are arranged in the vibrating body at a vertical distance from a center of gravity. Thus, a torque arm between the vibrating devices is present, whereby a torque around a machine-direction axis is generated in the vibrating body, causing it to turn in a reciprocating manner relative to the machine-direction x-axis. The turning motion may further improve the processing of a sticky and flake-like material, for example.

According to an embodiment, at least two second vibrating devices are arranged in the vibrating body at a distance from a center of gravity or at the center of gravity. The vibrating devices are unbalance devices and their direction of rotation can be opposite to each other, or it can be the same. It has been noted that when a relatively low lateral vibration is utilized, all variations disclosed above can be utilized.

According to an embodiment, one second vibrating device is arranged in the vibrating body at a distance from a center of gravity. It has been noted that this embodiment is suitable at least for small vibrating equipment.

According to an embodiment, one single second vibrating device is arranged in the vibrating body at a distance from a center of gravity. The second vibrating device may be arranged in one side plate of the vibrating body. The second vibrating device may comprise a rotating device and at least one unbalance weight, which is rotated by the rotating device around a rotational axis. The second vibrating device may be arranged at a distance from the center of gravity. The distance may be in x-direction, y-direction or z-direction, or alternatively, the distance may occur simultaneously in two or all of the directions x, y and z. When z-direction or y-direction distance occur, or distances in both z and y direction occur, then the vibrating body may sway relative to x-axis when the second vibrating device is operated. The swaying may improve material handling properties of the vibrating equipment.

According to an embodiment, a position of at least one second vibrating device is adjustable. Thus, it is possible to adjust the turning motion around the x-axis, for example.

According to an embodiment, the second vibrating device is a linear vibrating device. The linear vibrating device may be a device comprising a reciprocating piston or unbalance element. A percussion device comprising a percussion piston may be utilized, for example. The linear vibrating device may be hydraulically operated or it may be electrical.

According to an embodiment, the vibrating equipment is a vibrating screen comprising at least one screen deck provided with apertures. Thanks to the lateral vibrating movement, clogging of the screen apertures can be prevented effectively. Consequently, less maintenance is needed. A further advantage is that screening capacity can be increased. This makes it possible to make the vibrating screen deck shorter. Further, it has been surprisingly noted that the service life of the laterally vibrating screen deck may be clearly longer than that of traditional equipment. Thus, the lateral vibration decreases wearing of the screen deck.

According to an embodiment, the vibrating screen comprises at least two screen decks arranged one above the other. The decks may be provided with a mutually different aperture size. Alternatively, the lowermost deck may be without any openings. In some cases, the device may comprise three or four decks.

According to an embodiment, the vibrating equipment is a vibrating feeder.

According to an embodiment, the vibrating feeder comprises one single vibrating deck. The vibrating deck may be provided with several apertures, whereby small particles may drop out of the deck during feeding process. Alternatively, the vibrating deck may be blind, i.e. without any apertures, when no need for any screening exists during the feeding.

According to an embodiment, the vibrating equipment comprises one or more coarse-bar-screen decks and one or more conventional screen decks with apertures below the coarse-bar-screen decks. In this embodiment, the coarse-bar-screen decks and the conventional screen decks may be vibrated laterally in a manner disclosed in this application. Alternatively, it is possible to direct lateral vibration to the conventional screen deck or the coarsebar-screen deck only.

According to an embodiment, the vibrating equipment comprises at least one control unit for controlling operation of the vibrating devices independently.

According to an embodiment, the vibrating equipment comprises at least one control device for adjusting a rotation speed of a rotating unbalance device. The control device may be an inverter or a corresponding electrical control device or element. By controlling the rotation speed of an unbalance motor and an eccentric weight it is possible to influence vibration intensity of the second vibration device. The rotation speed is thus one possible control parameter of the vibrating equipment.

According to an embodiment, one or more second vibrating devices are arranged as auxiliary devices to existing vibrating equipment, such as a vibrating feeder or a vibrating screen. Further, the presented solution may relate to a method of updating existing vibrating equipment, the method comprising mounting one or more second vibrating devices to the existing vibrating equipment so that the vibrating deck may be vibrated in a lateral direction.

According to an embodiment, a lateral vibrating unit for producing lateral vibrations is formed. The vibration unit comprises at least one second vibrating device for generating vibrating movement. The vibrating unit further comprises mounting means allowing the vibrating unit to be mounted to a vibrating body of the vibrating equipment. The mounting means may comprise a mounting plate, which may be attached to an outer side surface, such as a side plate, of the vibrating body. Further, the vibrating unit comprises power supply means for transmitting necessary driving power. When the vibrating device of the vibrating unit comprises a rotating unbalance weight or another rotating vibrating element, the mounting means are formed so that they set a rotational axis of the vibrating device in an xy-plane. The rotational axis may be vertical or horizontal. The disclosed lateral vibrating unit may be mounted easily and quickly to different vibrating feeders and screens.

According to an embodiment, the second vibrating device is a rotating unbalance device which is arranged at an angle to the direction of the vibrating body. Thereby a rotation axis of the second vibrating device may deviate from vertical and horizontal directions.

According to an embodiment, the vibrating deck is horizontal or substantially horizontal.

According to an embodiment, the vibrating deck is inclined and is sloping downward towards the discharge end.

According to an embodiment, the vibrating deck is inclined and is sloping upward towards the discharge end. The ascending vibrating deck may be utilized for example in the vibrating screening machines.

According to an embodiment, the vibrating equipment comprises inclination means for arranging at least the vibrating deck in an inclined position so that the vibrating deck is sloping in a desired manner or is positioned horizontally. By means of the inclination means, it is possible to adjust the inclination angle according to the material being processed and other processing parameters.

According to an embodiment, the vibrating equipment is intended and used for processing a loose material, such as a granular or flake-like material.

According to an embodiment, the vibrating equipment is intended and used for processing a loose soil material such as a rock material, ore, coal or limestone.

The above-disclosed embodiments may be combined in order to form suitable solutions, which are provided with necessary features disclosed above.

BRIEF DESCRIPTION OF THE FIGURES

Some embodiments are described in more detail in the accompanying drawings, in which FIG. 1 schematically shows a side view of vibrating equipment, FIG. 2 schematically shows a top view of the vibrating equipment shown in FIG. 1, FIGS. 3 to 5 are schematic views showing some alternatives for positioning lateral vibrating means.

For the sake of clarity, the figures show some embodiments of the disclosed solution in a simplified manner. In the figures, like reference numerals identify like elements.

DETAILED DESCRIPTION OF SOME EMBODIMENTS

Figure 1:
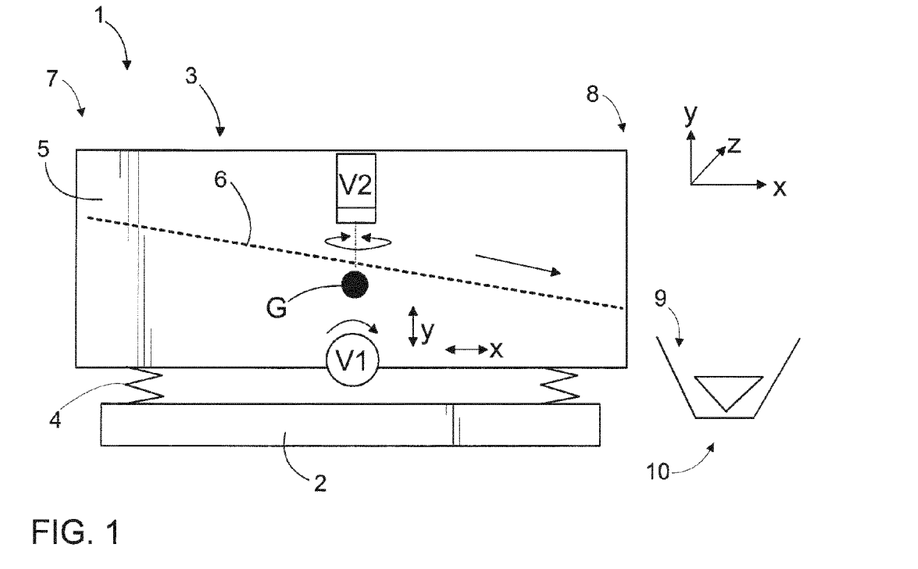
Figure 2:
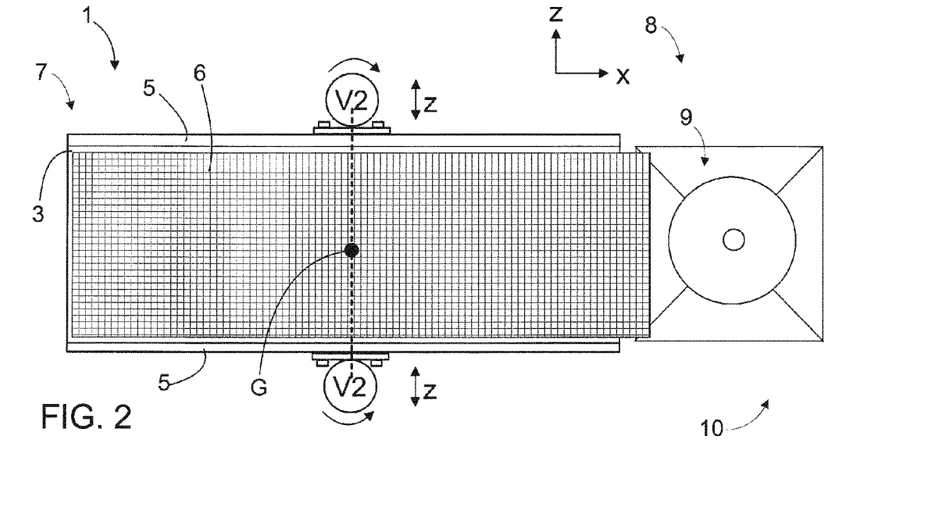

FIGS. 1 and 2 show vibrating equipment 1 suitable for transporting and screening of a material. The vibrating equipment 1 comprises a frame 2 and a vibrating body 3 supported above the frame 2. Between the frame 2 and the body 3 are provided several spring elements 4, such as spiral springs. The vibrating body 3 comprises side plates 5, or side walls, and it is further provided with one, two, three or even more vibrating deck 6. The equipment in FIGS. 1 and 2 has one single vibrating deck 6, which is sloping downwards and is provided with several apertures serving for screening purposes. A material to be processed is fed onto the vibrating deck at a feed end 7, and, finally the material is discharged at a discharge end 8. Thus, the processed material moves during processing in a machine direction x from the feed end 7 to the discharge end 8. The discharged material may be dropped to a feed opening 9 of a crusher 10. Alternatively, the discharged material may be dropped to a pile or to a transport member, such as a transport band or truck.

The vibrating body 3 is vibrated by one or more first vibrating devices V1. The first vibrating device V1 causes the vibrating deck 6 to move in a vertical direction y and in a machine direction x. The first vibrating device V1 may comprise a rotating unbalance weight which generates force components in y and x directions. The vibrating body 3 is also vibrated by one or more second vibrating devices V2. The purpose of the second vibrating device V2 is to vibrate the vibrating deck 6 in a lateral direction z, which is transverse to vibration components x and y produced by the first vibration device V1. The second vibration device V2 may comprise a rotating unbalance weight which is rotated by means of a rotating device.

As shown in FIG. 2, two second vibrating devices V2 may be arranged on both sides of the vibrating body 3. The vibrating device V2 may be fastened to outer surfaces of the side plates 5. A rotational axis of the second vibrating devices V2 may be vertical. Both second vibrating devices V2 may be arranged at a center of gravity G of the vibrating equipment. Further, rotating directions of the second vibrating devices V2 on the opposite sides are opposite to each other. The purpose of these features is to avoid forces in the direction x to be generated and directed to the vibration deck 6. When the unbalance weights of the second vibrating devices V2 are synchronized and are rotating in opposite directions, they eliminate forces in the x-direction.

Figure 3:
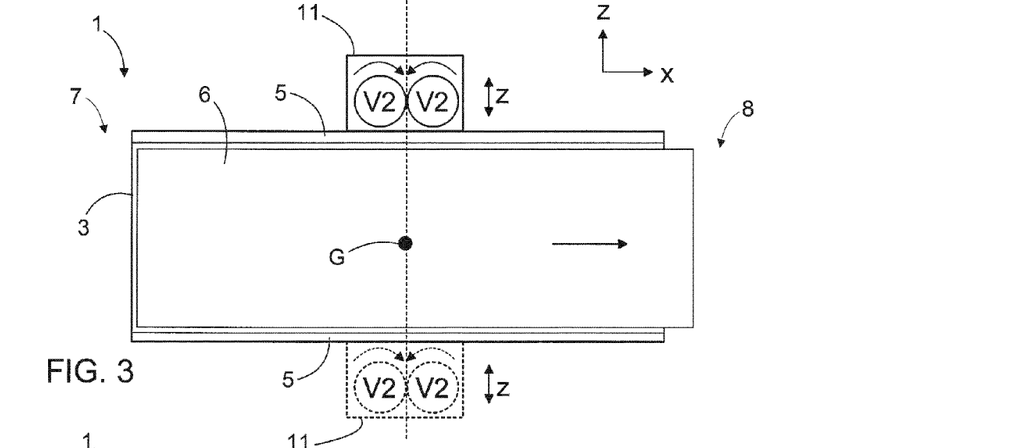

FIG. 3 shows vibrating equipment 1 provided with a pair 11 of rotating second vibration devices V2 which are arranged next to each other and are functioning as one unit. The second vibration devices V2 of the pair 11 have opposing rotation directions, whereby forces in the machine direction x are compensated. The functional and physical vibrating pair 11 may be arranged at a centre of gravity G. It is possible to arrange two disclosed vibrating pairs 11 on both sides of the vibrating body, as demonstrated in broken lines.

Figure 4:
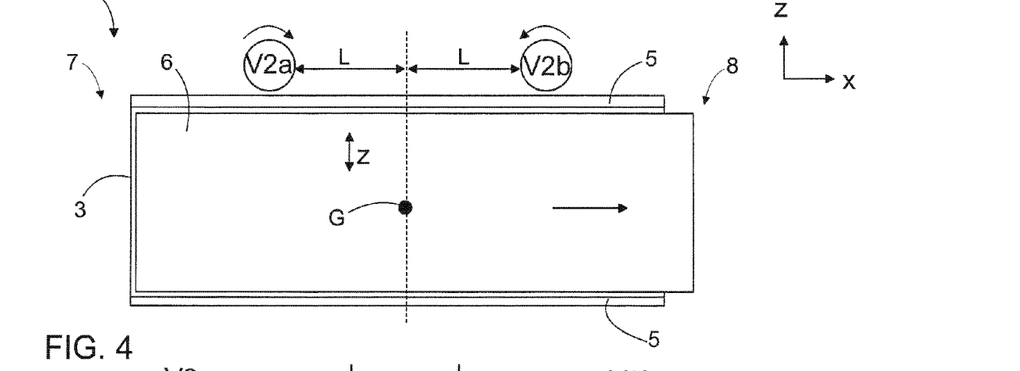

In FIG. 4, two second vibrating devices V2a, V2b are arranged at a distance from each other and at a distance L from a center of gravity G of the vibrating equipment. When the two second vibrating devices V2a, V2b are located at the equal distance L from the center of gravity G, forces other than desired forces causing lateral z-movement are eliminated. However, if such other forces are allowed, the rotating directions of the second vibrating devices may be the same and, further, it may be possible to use only one second vibrating device instead of two.

In FIG. 4 the second vibrating devices V2a, V2b are arranged so that their rotation axes are vertical.

Figure 5:
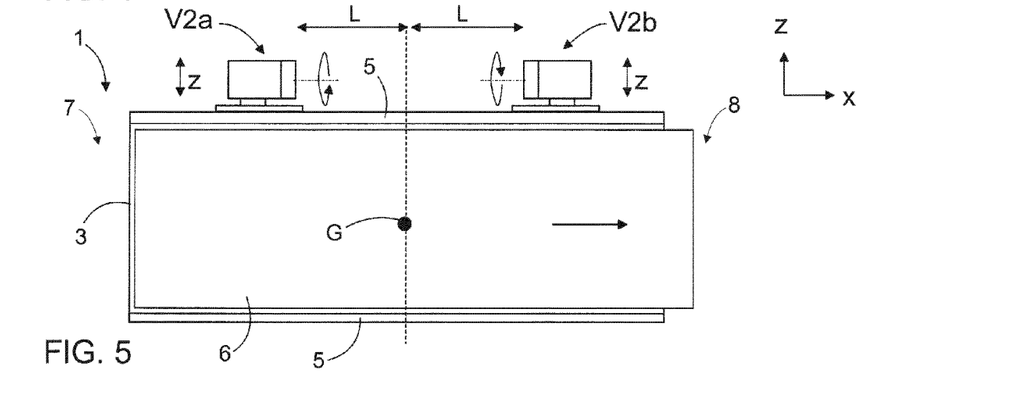

The solution of FIG. 5 differs from the solution of FIG. 4 in that the rotation axes of the second vibrating devices V2a, V2b are horizontal.

In FIGS. 3 to 5 the vibrating deck is blind, i.e. it is without apertures. The vibrating equipment provided with the blind vibrating deck may be a feeder suitable for transporting a material.

Figures 6, 7, 8:
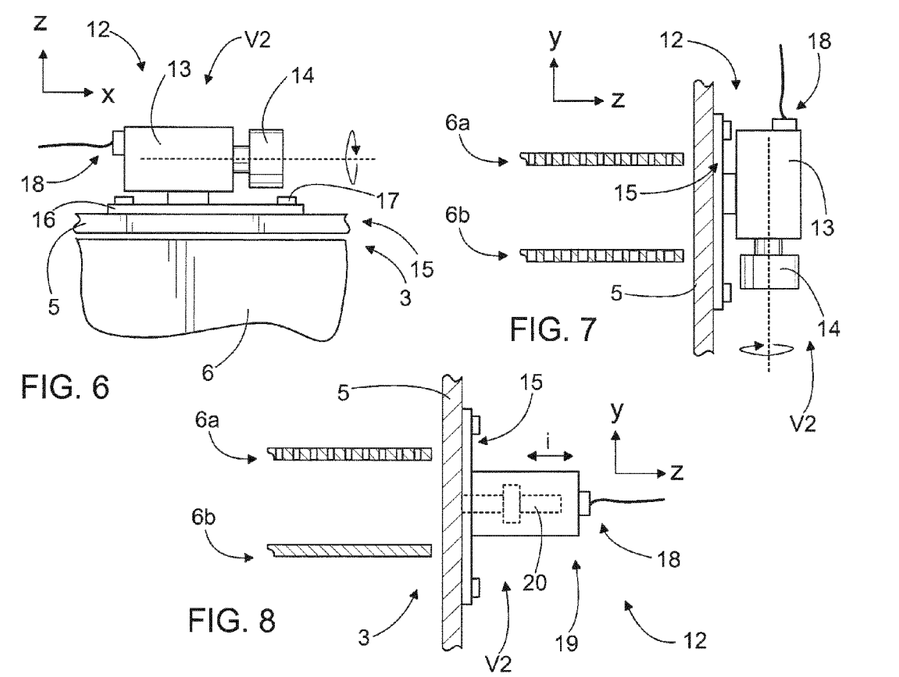
FIG. 6 is a schematic top view illustrating a vibrating unit arranged in a side plate of a vibrating body, a rotational axis of the vibrating unit being horizontal.
FIG. 7 is a schematic sectional view seen in a machine direction of a vibrating unit mounted to a vibrating body and having a vertical rotational axis.
FIG. 8 shows still another vibrating unit provided with a reciprocating unbalance element for producing linear vibration.

FIG. 6 shows a lateral vibrating unit 12 for producing lateral vibrations. The vibration unit 12 comprises at least one second vibrating device V2 for generating a vibrating movement. The second vibrating device V2 may comprise a rotating device 13 which is arranged to rotate an unbalance weight 14. The vibrating unit 12 further comprises mounting means 15 allowing the vibrating unit 12 to be mounted to a vibrating body 3 of the vibrating equipment. The mounting means 15 may comprise a mounting plate 16, which may be attached to an outer side surface, such as a side plate 5, of the vibrating body 3 by fastening elements 17. Furthermore, the vibrating unit 12 comprises power supply means 18 for transmitting necessary driving power. The mounting means 15 are formed so that they set a rotational axis of the second vibrating device V2 horizontally.

FIG. 7 shows an alternative lateral vibrating unit 12 which differs from the one shown in FIG. 6 in that the rotating axis of the second vibrating device V2 is vertical. FIG. 7 also shows a structure of a screening device, which comprises two vibrating screen decks 6a, 6b, one above the other. The upper screen deck 6a has larger screening apertures than the lower screen deck 6b.

FIG. 8 shows a lateral vibrating unit 12 comprising a linear vibrating device 19. The linear vibrating device 19 may comprise a reciprocating piston 20 or unbalance element. It is possible to utilize a hydraulic or electric percussion device for producing linear impacts i on the vibrating body 3.

Figure 9:
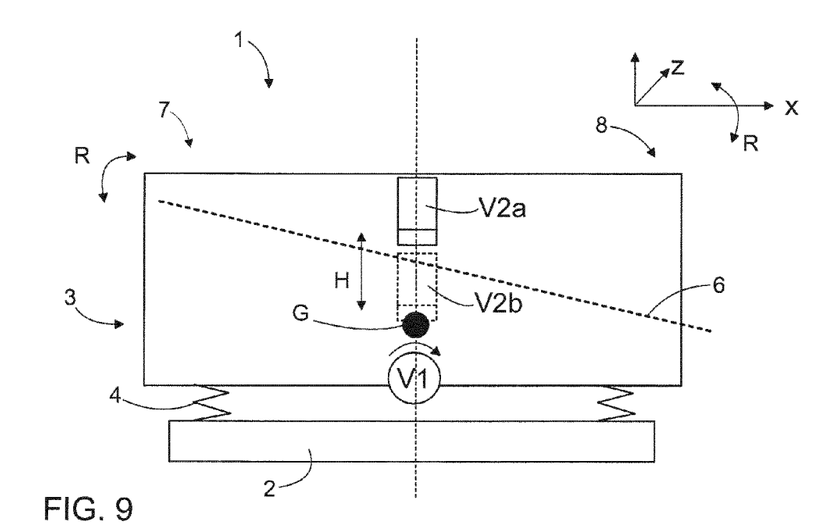
FIG. 9 is a schematic side view showing vibrating equipment wherein a vibrating deck is arranged to turn around a machine-direction x-axis.

FIG. 9 demonstrates that the vibrating deck 6 may be turned R in a reciprocating manner around the machine-direction axis x. This turning motion R may be achieved by arranging the second vibrating devices V2a and V2b at an unequal vertical distance H from the center of gravity G. The generated turning R movement may further improve processing of problematic materials.

Figure 10:
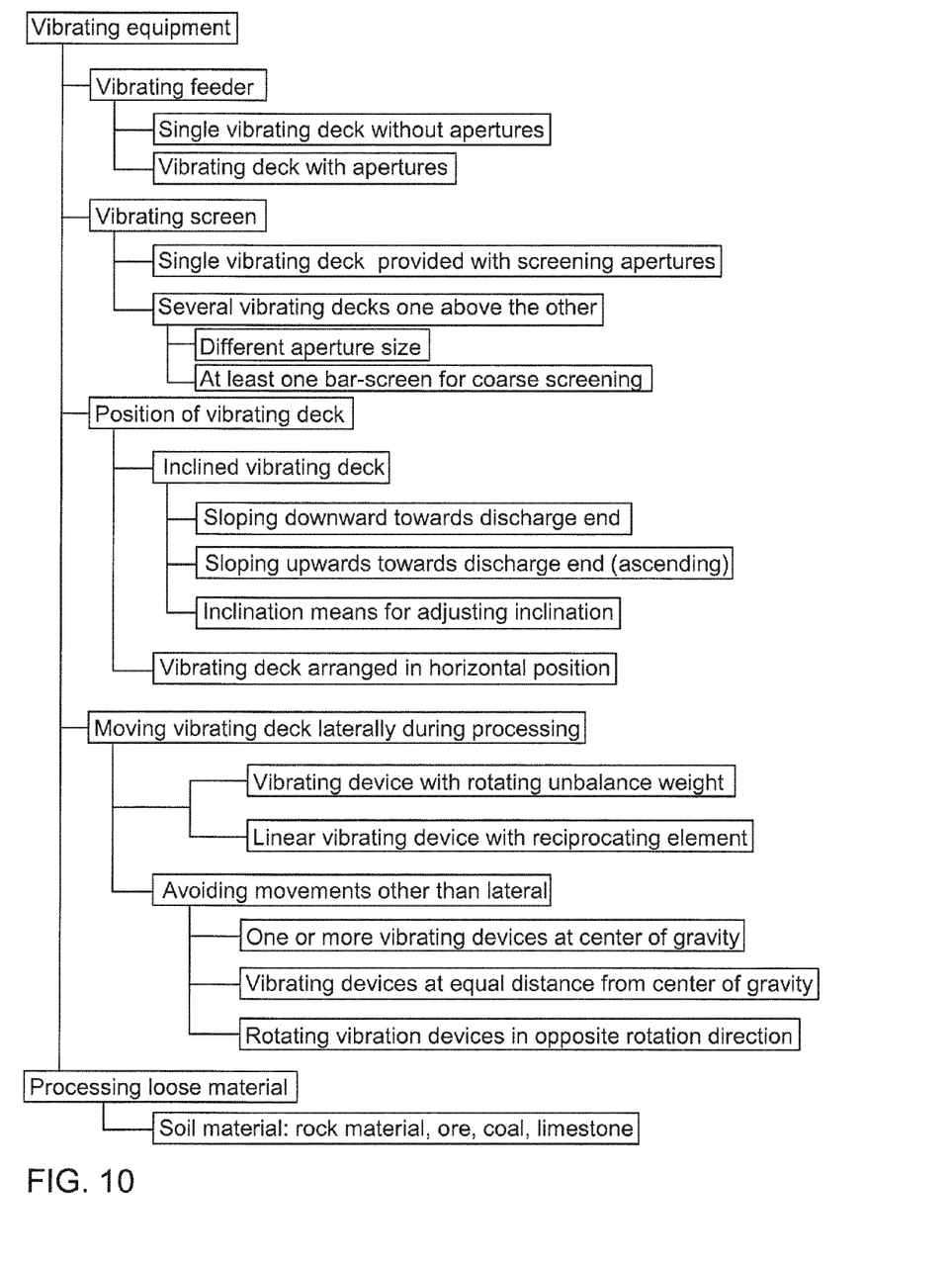
FIG. 10 is a simplified chart showing some features relating to vibrating equipment.

FIG. 10 is a simplified chart showing some issues and features relating to vibrating equipment and processing of a material.

Figure 11A:
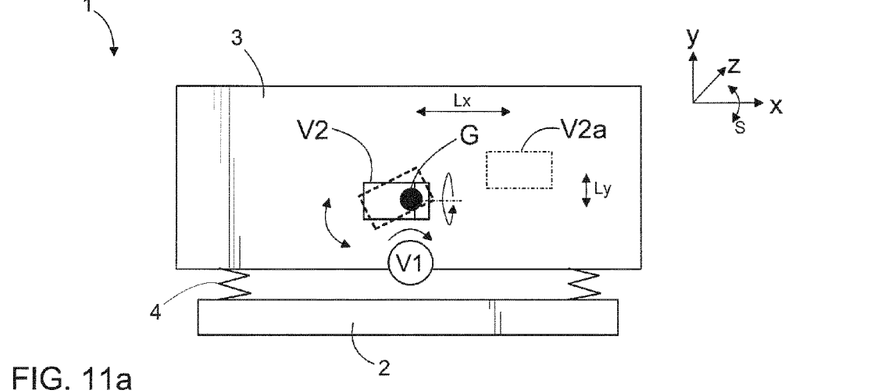
FIG. 11a is a schematic side view showing alternative ways of positioning a second vibrating device in a side plate of a vibrating body of a vibrating equipment.
Figure 11B:
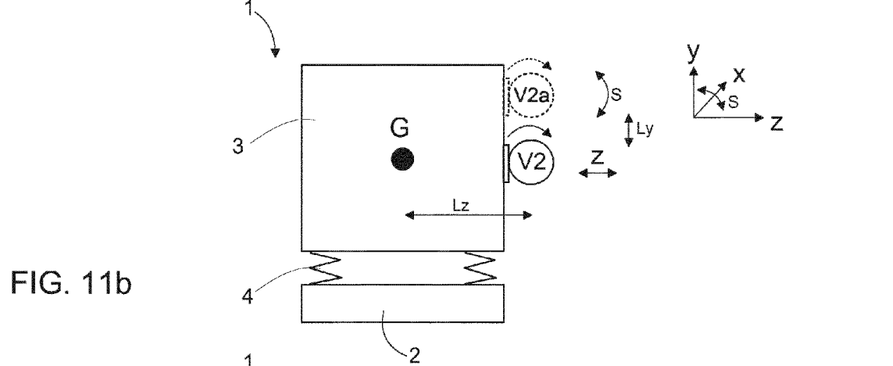
FIG. 11b is a schematic end view of the same vibrating equipment.

FIG. 11a shows that one single second vibrating device V2 is mounted in a side plate of a vibrating body at a centre of gravity G when seen from the side. An alternative angular mounting position of the second vibrating device V2 is shown in broken lines. It is possible to choose the angular position of the second vibrating device as desired. Another alternative is to arrange the second vibrating device at a distance from the centre of gravity G, as it is shown by reference numeral V2a. The second vibrating device V2a may be arranged at an x-direction distance $L_x$ from the centre of gravity G, or at an y-direction distance $L_y$ from the centre of gravity, or it may be arranged so that both distances $L_x$ and $L_y$ occur, which is the case in FIG. 11b. FIG. 11b shows that the second vibrating device V2 locates at a lateral distance $L_z$ from the centre of gravity G causing the desired lateral movement in the direction z. In addition to z-direction movement, the vibrating body 3 may sway S relative to X-axis because the second vibrating device V2 or V2a is arranged at the distance $L_z$ and possibly also at the distance $L_y$ from the centre of gravity G. The swaying S makes the vibrating body to operate 3,5-dimensionally. Thanks to the swaying S the screening and processing of the material may be further improved.

Figure 12:
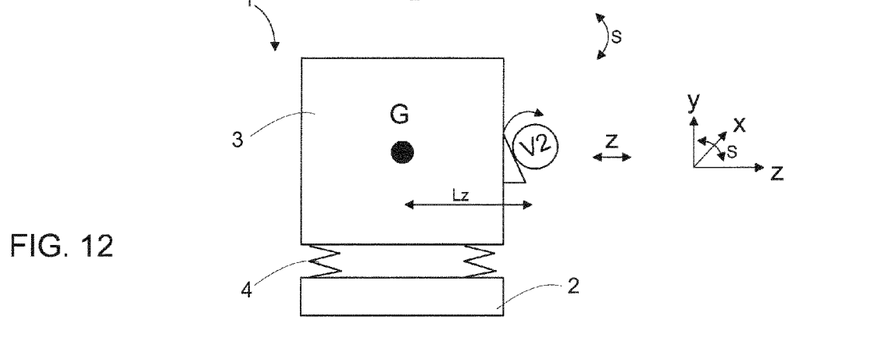
FIG. 12 in a schematic end view showing an alternative fastening of a second vibrating device in a side plate of a vibrating body.

Further, FIG. 12 illustrates that the second vibrating device V2 may be arranged in an angular position relative to a vertical direction. In FIGS. 11a, 11b and 12 one single second vibrating device may be used and it may comprise a rotating unbalance device. The drawings and the related description are only intended to illustrate the idea of the invention. In its details, the invention may vary within the scope of the claims.

The invention claimed is:

1. Vibrating equipment for processing a material, comprising:
    a frame;
    at least one vibrating body supported on the frame vertically by spring elements;
    at least one vibrating deck arranged in the vibrating body, the at least one vibrating deck having a feed end and a discharge end, wherein a machine direction of the vibrating equipment, which is determined by a direction of the feed end and the discharge end, corresponds to a direction of motion of the material to be processed;
    at least one first vibrating device for vibrating the vibrating body and causing the vibrating deck to move in a vertical direction and in the machine direction; and
    at least one independent second vibrating device causing the vibrating body to vibrate in a lateral direction relative to an xy-plane,
    wherein the at least one first and second vibrating devices are configured to vibrate the deck in the machine, vertical and lateral directions simultaneously.

2. The vibrating equipment as claimed in claim 1, wherein the at least one second vibrating device is physically and functionally independent of the at least one first vibrating device.

3. The vibrating equipment as claimed in claim 1, wherein the vibrating body includes side plates, which are in the machine direction and delimit the vibrating body in the lateral direction, the at least one second vibrating device being mounted to a side plate of the at least one vibrating body, whereby the at least one second vibrating device vibrates the at least one vibrating body and the vibrating deck in the lateral direction.

4. The vibrating equipment as claimed in claim 1, wherein the at least one second vibrating device is arranged at a center of gravity of the vibrating equipment.

5. The vibrating equipment as claimed in claim 1, further comprising two second vibrating devices, the second vibrating devices being arranged at a center of gravity and on opposite sides of the at least one vibrating body.

6. The vibrating equipment as claimed in claim 1, further comprising at least two second vibrating devices arranged at a distance from each other and at an equal distance from the center of gravity.

7. The vibrating equipment as claimed in claim 1, further comprising two second vibrating devices arranged at a center of gravity, each second vibrating device including a rotating device and at least one unbalance weight, which is rotated by the rotating device.

8. The vibrating equipment as claimed in claim 7, wherein a pair of second vibrating devices is arranged at least on one side of the at least one vibrating body, the pair of second vibrating devices being arranged at the center of gravity.

9. The vibrating equipment as claimed in claim 7, wherein rotation directions of the two second vibrating devices are transverse to each other.

10. The vibrating equipment as claimed in claim 1, wherein at least two second vibrating devices are arranged in the at least one vibrating body at a different vertical height from a center of gravity, whereby a torque around a machine direction axis is generated in the at least one vibrating body; and a reciprocating turning motion relative to the machine direction axis is generated in the vibrating deck during operation.

11. The vibrating equipment as claimed in claim 10, wherein a position of the at least two second vibrating devices is adjustable.

12. The vibrating equipment as claimed in claim 1, wherein the vibrating equipment is a vibrating screen provided with at least one vibrating screen deck, the vibrating screen deck including several screening apertures.

13. The vibrating equipment as claimed in claim 12, further comprising at least two vibrating decks arranged one above the other and provided with a mutually different aperture size.

14. The vibrating equipment as claimed in claim 1, wherein the vibrating equipment is a vibrating feeder provided with a blind vibrating deck.

15. A method of processing a material, the method comprising the steps of:
    using vibrating equipment including a frame, a vibrating body positioned above the frame, spring means between the frame and the body, and at least one vibrating deck having a feed end and a discharge end;

feeding the material on the at least one vibrating deck at the feed end;

vibrating the vibrating body using at least one first vibrating device and allowing the at least one vibrating deck to move in a vertical direction and in a machine direction of the vibrating equipment;

moving the material on the at least one vibrating deck towards the discharge end in the machine direction;

discharging the material at the discharge end;

vibrating the vibrating body using at least one second vibrating device, wherein the vibrating body vibrates in a lateral movement relative to an xy-plane; and generating the lateral movement independently of the vertical movement and the machine direction movement, wherein the at least one first and second vibrating devices are configured to vibrate the deck in the machine, vertical and lateral directions simultaneously.

* * * * *